(12) United States Patent
Ishikawa

(10) Patent No.: US 6,909,889 B2
(45) Date of Patent: Jun. 21, 2005

(54) PRINT SERVICE SYSTEM, PRINT ORDER RECEIVING SERVER, IMAGE STORAGE SERVICE SYSTEM, IMAGE STORAGE SERVER AND MOBILE TELEPHONE

(75) Inventor: Takatoshi Ishikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 527 days.

(21) Appl. No.: 09/970,927

(22) Filed: Oct. 5, 2001

(65) Prior Publication Data

US 2002/0042263 A1 Apr. 11, 2002

(30) Foreign Application Priority Data

Oct. 6, 2000 (JP) ............................. P2000-307983
Oct. 6, 2000 (JP) ............................. P2000-308079
Nov. 21, 2000 (JP) ............................. P2000-354382

(51) Int. Cl.$^7$ ............................................... H01S 4/00
(52) U.S. Cl. .................................................. 455/414.1
(58) Field of Search ........................................ 455/412

(56) References Cited

U.S. PATENT DOCUMENTS 5,974,401 A * 10/1999 Enomoto et al. .............. 705/40
6,701,845 B2 * 3/2004 Ohmura ....................... 101/484
6,789,113 B1 * 9/2004 Tanaka ......................... 709/223
2001/0048534 A1 * 12/2001 Tanaka et al. ............. 358/1.16
2001/0049784 A1 * 12/2001 Nomoto ....................... 713/513
2002/0054331 A1 * 5/2002 Takenobu et al. .......... 358/1.15

* cited by examiner

Primary Examiner—Creighton Smith
(74) Attorney, Agent, or Firm—Birch, Stewart, Kolasch & Birch, LLP.

(57) ABSTRACT

It is an object to provide a print service system capable of easily giving, from a moving destination, a print order of a digital image photographed at the moving destination and immediately acquiring a necessary print.

A user requiring to print a digital image fetches digital image information to a mobile telephone 5 and transmits the digital image information, together with order request information, to a print order receiving server through a network 1. The order request information includes print condition information. When receiving the digital image information and the print condition information, the print order receiving server 2 transmits digital image information to be printed to a printer server to be a printing destination corresponding to a print condition. At the printing destination, an order print created based on the information transmitted to the print server is delivered to a registered delivery destination which is transmitted.

9 Claims, 11 Drawing Sheets

FIG. 8

SELECT PRINTING METHOD

1. COLOR PAPER (GLOSSY)
2. COLOR PAPER (MAT)
3. INK JET (GLOSSY)
4. INK JET (PLAIN PAPER)
5. D2T2

PRINT SERVICE SYSTEM, PRINT ORDER RECEIVING SERVER, IMAGE STORAGE SERVICE SYSTEM, IMAGE STORAGE SERVER AND MOBILE TELEPHONE

BACKGROUND OF THE INVENTION

1. Field of the Invention

The present invention relates to a print service system and a print order receiving server for creating a print based on digital image information, and more particularly to a print service system capable of giving a request for creating a print at a moving destination and simplifying the receipt of the print and a print order receiving server for receiving the request for creating a print from the moving destination.

The present invention also relates to a storage service system for storing digital image information, an image storage server and a mobile telephone for transmitting image information to be stored.

2. Description of the Related Art

A hard copy of an image photographed by a digital camera is generally printed through a color printer at home. In the case in which an image print of high quality is required, it is also possible to bring a recording medium recording digital image data to a service shop for providing a print service of high quality or to transmit digital image data through a network 3, thereby giving an order of a print of high quality.

On the other hand, there has also been proposed image transfer using a mobile telephone (including a PHS) at a moving destination with the rapid spread of the mobile telephone, an enhancement in a communicating speed and a reduction in a communication charge.

Although image information photographed by a digital camera is recorded in a built-in memory for image storage which is provided in a camera or a recording medium which can be attached to and removed from the camera, the capacity of the memory provided in the camera is limited and a removable recording medium is generally utilized because image data can easily be handled. However, the recording medium which can be attached to and removed from a digital camera for recording image information has a limited recording capacity and is expensive, and is sold in only limited places. For this reason, it has been proposed that image information photographed at a moving destination is transferred to a computer at home by using a mobile telephone and the recorded information of the recording medium is erased and recycled.

One of features of the digital camera is that a photographed image can be confirmed at any time, and therefore, it is a matter of course that a request for immediately acquiring the confirmed image print is also given. As described above, however, a print order based on a digital image is to be given by bringing to a service shop or by means of a personal computer at home. Therefore, it is impossible to satisfy the request for immediately acquiring an image print.

Further, in the case in which the photographed image information is to be transferred by using a mobile telephone at a moving destination, it cannot be clearly decided whether or not the transferred image information is reliability stored in a storage device to be a transfer destination. Therefore, there is an anxiety about the erase of the image information recorded in the recording medium.

SUMMARY OF THE INVENTION

It is an object of the invention to provide a print service system capable of easily giving a print order for a digital image photographed at a moving destination from the moving destination and immediately acquiring a necessary print and a print order receiving server for receiving a request for creating a print from the moving destination.

It is another object of the invention to provide a mobile telephone capable of easily giving a print order for a digital image photographed at a moving destination from the moving destination and further a service capable of receiving created prints according to an order conveniently.

Further, it is an object of the invention to provide an image storage service system capable of confirming that image information transferred at a moving destination is reliably stored at a transfer destination. Moreover, it is an object of the invention to provide a service system capable of easily giving a print order for a digital image photographed at a moving destination from the moving destination or by means of a computer at home.

A first aspect of the invention is a print service system comprising an order receiving server connected to a network and a mobile telephone which can be connected to the network, wherein the mobile telephone serves to transmit digital image information to be printed and order request information including print condition information for specifying a print condition to the order receiving server through the network, and the order receiving server serves to transmit the received digital image information and print condition information to a printing destination corresponding to the received print condition information.

A second aspect of the invention is the print service system according to the first aspect, wherein the order receiving server serves to transmit delivery information for delivering a created print to a delivery destination specified previously for the mobile telephone to the printing destination together with the digital image information and the print condition information which are received.

A third aspect of the invention is a print service system comprises an order receiving server connected to a network and a mobile telephone which can be connected to the network, wherein the mobile telephone serves to transmit digital image information to be printed which specifies a print condition and order request information including print condition information and receipt information for specifying a method of receiving a created print to the order receiving server through the network, and the order receiving server serves to transmit the received digital image information and print condition information to a printing destination corresponding to the print condition information and the receipt information which are received.

A fourth aspect of the invention is the print service system according to the third aspect, wherein the receiving method includes receipt at a print service shop and delivery to a previously specified delivery destination.

A fifth aspect of the invention is the print service system according to the fourth aspect, wherein the print service shop included in the receiving method is selected from a plurality of print service shops which can carry out receipt which are presented to the mobile telephone by the order receiving server.

A sixth aspect of the invention is the print service system according to the fifth aspect, wherein a plurality of print service shops capable of carrying out receipt which are presented to the mobile telephone by the order receiving server are located in predetermined regions based on information about a position of the mobile telephone.

A seventh aspect of the invention is the print service system according to the fourth aspect, wherein the printing destination is a print service shop included in the print condition information and the receipt information which are received or a printing destination corresponding to the specified delivery destination.

An eighth aspect of the invention is the print service system according to the seventh aspect, wherein the order receiving server serves to transmit delivery information for delivering a created print to the print service shop or the specified delivery destination to the printing destination together with the digital image information and the print condition information which are received.

A ninth aspect of the invention is the print service system according to the first aspect or the third aspect, wherein the print condition includes at least one of a printing method, a print size and the number of prints for the digital image information on per image basis.

A tenth aspect of the invention is the print service system according to the ninth aspect, wherein the printing method includes specification of a print medium.

An eleventh aspect of the invention is the print service system according to the first or third aspect, wherein the order request information further includes a method of settling a print charge.

A twelfth aspect of the invention is the print service system according to the eleventh aspect, wherein the settling method includes payment added to a telephone charge, payment on receipt at a receiving destination, and payment on delivery at a specified delivery destination.

A thirteenth aspect of the invention is the print service system according to the first aspect or the third aspect, wherein the order request information further includes saving specifying information of transmitted digital image information.

A fourteenth aspect of the invention is the print service system according to the thirteenth aspect, wherein the saving specifying information serves to specify saving in the order receiving server or another server or saving in a portable recording medium.

A fifteenth aspect of the invention is the print service system according to the first aspect or the third aspect, wherein the order receiving server gives the mobile telephone a notice that a print is completed or receipt can be carried out.

A sixteenth aspect of the invention is the print service system according to the first aspect or the third aspect, wherein the order receiving server gives a notice of a situation of progress of requested print creation in response to an inquiry sent from the mobile telephone.

A seventeenth aspect of the invention is the print order receiving server according to the invention serves to receive digital image information to be printed and order request information including print condition information for specifying a print condition from a mobile telephone trough a network and to transmit the received digital image information and print condition information to a printing destination corresponding to the received print condition information.

An eighteenth aspect of the invention is the print order receiving server according to the seventeenth aspect, wherein delivery information for delivering a created print is transmitted to a delivery destination specified previously for the mobile telephone to the printing destination together with the digital image information and the print condition information which are received.

A nineteenth aspect of the invention is the print order receiving server serves to receive digital image information to be printed and order request information including print condition information for specifying a print condition and receipt information for specifying a method of receiving a created print from a mobile telephone trough a network and to transmit the received digital image information and print condition information to a printing destination corresponding to the print condition information and the receipt information which are received.

A twentieth aspect of the invention is the print order receiving server according to the nineteenth aspect, wherein the receiving method includes receipt at a print service shop and delivery to a previously specified delivery destination.

A twenty first aspect of the invention is the print order receiving server according to the twentieth aspect, having a function of presenting, to a mobile telephone, a plurality of print service shops capable of carrying out receipt, wherein the print service shop included in the receiving method is selected from a plurality of print service shops capable of carrying out receipt which are presented.

A twenty second aspect of the invention is the print order receiving server according to the twenty first aspect, wherein a plurality of print service shops capable of carrying out receipt which are presented to the mobile telephone are located in predetermined regions based on information about a position of the mobile telephone.

A twenty third aspect of the invention is the print order receiving server according to the twentieth aspect, wherein the printing destination is a print service shop included in the print condition information and the receipt information which are received or a printing destination corresponding to the specified delivery destination.

A twenty fourth aspect of the invention is the print order receiving server according to the twenty third aspect, wherein delivery information for delivering a created print to the print service shop or the specified delivery destination is transmitted to the printing destination together with the digital image information and the print condition information which are received.

A twenty fifth aspect of the invention is the print order receiving server according to the seventeenth aspect or the nineteenth aspect, wherein the print condition includes at least one of a printing method, a print size and the number of prints for the digital image information per print basis.

A twenty sixth aspect of the invention is the print order receiving server according to the twenty fifth aspect, wherein the printing method includes specification of a print medium.

A twenty seventh aspect of the invention is the print order receiving server according to the seventeenth aspect or the nineteenth aspect, wherein the order request information further includes a method of settling a print charge.

A twenty eighth aspect of the invention is the print order receiving server according to the twenty seventh aspect, wherein the settling method includes payment added to a telephone charge, payment on receipt at a receiving destination, and payment on delivery at a specified delivery destination.

A twenty ninth aspect of the present invention is the print order receiving server according to the seventeenth aspect or the nineteenth aspect, wherein the order request information further includes saving specifying information of transmitted digital image information.

A thirtieth aspect of the present invention is the print order receiving server according to the twenty ninth aspect, wherein the saving specifying information serves to specify saving in the print order receiving server or another server or saving in a portable recording medium.

A thirty first aspect of the present invention is the print order receiving server according to the seventeenth aspect or the nineteenth aspect, wherein a notice that a print is completed or receipt can be carried out is given to the mobile telephone.

A thirty second aspect of the present invention is the print order receiving server according to the seventeenth aspect or the nineteenth aspect, wherein a notice of a situation of progress of requested print creation is given in response to an inquiry sent from the mobile telephone.

A thirty third aspect of the present invention is a mobile telephone for giving a print order based on digital image information, comprising a memory for storing digital image information to be printed and order request information creating means for creating order request information including print condition information for specifying a print condition of the digital image information, wherein an access can be given to an order receiving server for receiving a print order through a network and the digital image information to be printed which are stored in the memory and the order request information created by the order request information creating means are transmitted to the order receiving server.

A thirty fourth aspect of the invention is a mobile telephone which comprises a memory for storing digital image information to be printed and order request information creating means for creating order request information including print condition information for specifying a print condition of the image information and receipt information for specifying a method of receiving a created print, wherein an access can be given to an order receiving server for receiving a print order through a network and the digital image information to be printed which are stored in the memory and the order request information created by the order request information creating means are transmitted to the order receiving server.

A thirty fifth aspect of the invention is the mobile telephone according to the thirty fourth aspect, wherein the receiving method includes receipt at a print service shop and delivery to a delivery destination which is previously specified.

A thirty sixth aspect of the invention is the mobile telephone according to the thirty fifth aspect, wherein the print service shop included in the receiving method is selected from a plurality of print service shops capable of carrying out receipt which are presented by the order receiving server.

A thirty seventh aspect of the invention is the mobile telephone according to the thirty sixth aspect, wherein a plurality of print service shops capable of carrying out receipt which are presented by the order receiving server are located in predetermined regions based on information about a position of the mobile telephone.

A thirty eighth aspect of the invention is the mobile telephone according to the thirty third aspect or the thirty fourth aspect, wherein the print condition information includes at least one of a printing method, a print size and the number of prints for the digital image information.

A thirty ninth aspect of the invention is the mobile telephone according to the thirty eighth aspect, wherein the printing method includes specification of a print medium.

A fortieth aspect of the invention is the mobile telephone according to the thirty third aspect or the thirty fourth aspect, wherein the order request information creating means displays an image based on the digital image information on the mobile telephone and then creates the print condition information.

A forty first aspect of the invention is the mobile telephone according to the thirty third aspect or the thirty fourth aspect, wherein the order request information creating means can create the print condition information before giving an access to the order receiving server and serves to present a print charge after creating the print condition information A forty second aspect of the invention is the mobile telephone according to the thirty third aspect or the thirty fourth aspect, wherein the order request information further includes a method of settling a print charge.

A forty third aspect of the invention is the mobile telephone according to the forty second aspect, wherein the settling method includes payment added to a telephone charge, payment for receipt at a receiving destination, and payment for delivery at a specified delivery destination.

A forty fourth aspect of the invention is the mobile telephone according to the thirty third aspect or the thirty fourth aspect, wherein the order request information further includes saving specifying information of transmitted digital image information.

A forty fifth aspect of the invention is the mobile telephone according to the forty fourth aspect, wherein the saving specifying information serves to specify saving in the order receiving server or another server or saving in a portable recording medium.

A forty sixth aspect of the invention is an image storage service system for storing digital image information, comprising an image storage server connected to a network, and a mobile telephone to which a removable recording medium recording digital image information can be attached and which can be connected to the network, wherein the mobile telephone serves to transmit the digital image information recorded in the recording medium to the image storage server through the network, and the image storage server serves to store the digital image information thus received and to transmit storage processing information to the mobile telephone carrying out the transmission after a storage processing.

A forty seventh aspect of the invention is the image storage service system according to the forty sixth aspect, wherein after transmission and receipt of the digital image information are terminated, the mobile telephone and the image storage server are once disconnected from each other, and the image storage server serves to carry out a connection to the mobile telephone again during the transmission of the storage processing information.

A forty eighth aspect of the invention is the image storage service system according to the forty sixth aspect, wherein the mobile telephone serves to erase the transmitted digital image information from the recording medium depending on the storage processing information which is received.

A forty ninth aspect of the invention is the image storage service system according to the forty eighth aspect, wherein the mobile telephone serve to receive a storage processing signal and to then output contents thereof, and to wait for an erase indicating signal to be input and to erase the transmitted digital image information from the recording medium.

A fiftieth aspect of the invention is the mobile telephone in the image storage service system according to the invention further has a function of transmitting, to the image storage server, print request information of the transmitted and stored digital image information, and the image storage server further has a function of transmitting the stored digital image information to a predetermined printing destination when receiving the print request information.

A fifty first aspect of the invention is an image storage server for storing digital image information which receives digital image information to be stored which is transmitted from a mobile telephone through a network, and stores the digital image information thus received and transmits storage processing information to the mobile telephone carrying out the transmission after a storage processing. While it is indispensable to the storage processing information that whether or not the storage processing is completed (the storage fails) is indicated, a residual storage capacity, a saving period or a service charge may be included.

A fifty second aspect of the invention is the image storage server according to the fifty first aspect, wherein the mobile telephone is once disconnected after the receipt of the digital image information is terminated, and the mobile telephone is connected again during the transmission of the storage processing information.

A fifty third aspect of the invention is the image storage server according to the fifty first aspect, further having a function of receiving a print request for the stored digital image information, and a function of transmitting the stored digital image information to a predetermined printing destination when receiving the print request.

A fifty forth aspect of the invention is the image storage server according to the fifty first aspect, further having a function of receiving a downloading request for the stored digital image information and a function of transmitting the stored digital image information to a downloading request destination when receiving the downloading request.

A fifty fifth aspect of the invention is a mobile telephone accessible to an image storage server for storing digital image information through a network, wherein a removable recording medium recording digital image information can be attached to the mobile telephone, the mobile telephone further having means for erasing the transmitted digital image information from the recording medium depending on storage processing information received from the image storage server after transmitting the digital image information recorded in the recording medium to the image storage server.

A fifty sixth aspect of the invention is the mobile telephone according to claim 55, wherein the image storage server is once disconnected after the transmission of the digital image information is terminated, and the receipt of the storage processing information is carried out after the connection to the mobile telephone is performed again through the image storage server.

A fifty seventh aspect of the invention is the mobile telephone according to the fifty fifth aspect, wherein a storage processing signal is received and contents thereof are then output, and the transmitted digital image information is erased from the recording medium after waiting for an input of an erase indicating signal.

A fifty eighth aspect of the invention is the mobile telephone according to the fifty fifth aspect, further having a function of transmitting print request information of the transmitted and stored digital image information to the image storage server.

A fifty ninth aspect of the invention is the mobile telephone according to the fifty fifth aspect, further having a function of transmitting a downloading request of the stored digital image information, and a function of recording, in the recording medium, the digital image information received based on the downloading request.

BRIEF DESCRIPTION OF THE DRAWINGS

FIG. 8 is a diagram showing an example of display of a display section at the time of the input of a print condition.

DESCRIPTION OF THE PREFERRED EMBODIMENTS

Embodiments of the invention will be described below with reference to FIGS. 1 to 14.

Figure 1:
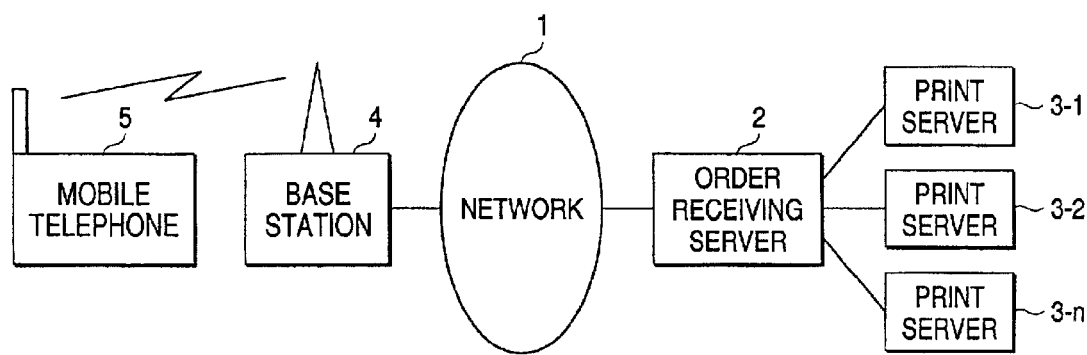
FIG. 1 is a diagram showing the schematic structure of a print service system according to the invention.

FIG. 1 is a diagram showing the schematic structure of a print service system according to the invention. A print order receiving server 2 is connected to a network 1 including a mobile telephone service network for mutually connecting base stations, and a plurality of print servers 3-1, 3-2 and 3-n are connected to the print order receiving server 2. The print server is provided in a service shop or a laboratory which carries out a print processing based on digital image information and serves to cause one or more printers to carry out a predetermined printing processing. In the drawing, three print servers are shown and the number of the print servers is not restricted to three.

A user who requires a digital image photographed by a digital camera to be printed fetches digital image information to a mobile telephone 5 and transmits digital image information and order request information to be printed to the print order receiving server 2 through the network 1. The order request information includes print condition information for specifying at least one of a printing method, a print size and the number of prints for each digital image to be printed. A mobile telephone number is utilized for the identification information of the user.

When the digital image information and the print condition information are received, the print order receiving server 2 transmits digital image information to be printed to a print server to be a printing destination according to the print condition. More specifically, the digital image information is transmitted to the print server to be the printing destination provided with a printer according to the print condition. In the case in which the print processing can be carried out in a plurality of printing destinations, a printing destination which is the closest to a delivery destination previously registered for a created print is selected. When transmitting the print image information and the print condition to the print server, delivery information required for delivery such as the name of a print ordering person and information about a registered delivery destination are also transmitted. Moreover, a different printing destination may be selected for each digital image.

At the printing destination, an order print created based on the information transmitted to the print server is delivered to the registered delivery destination which is transmitted. A request for the delivery may be given to a distributor. After the delivery is completed, a printing charge is added to a telephone charge and is thus collected.

Figure 2:
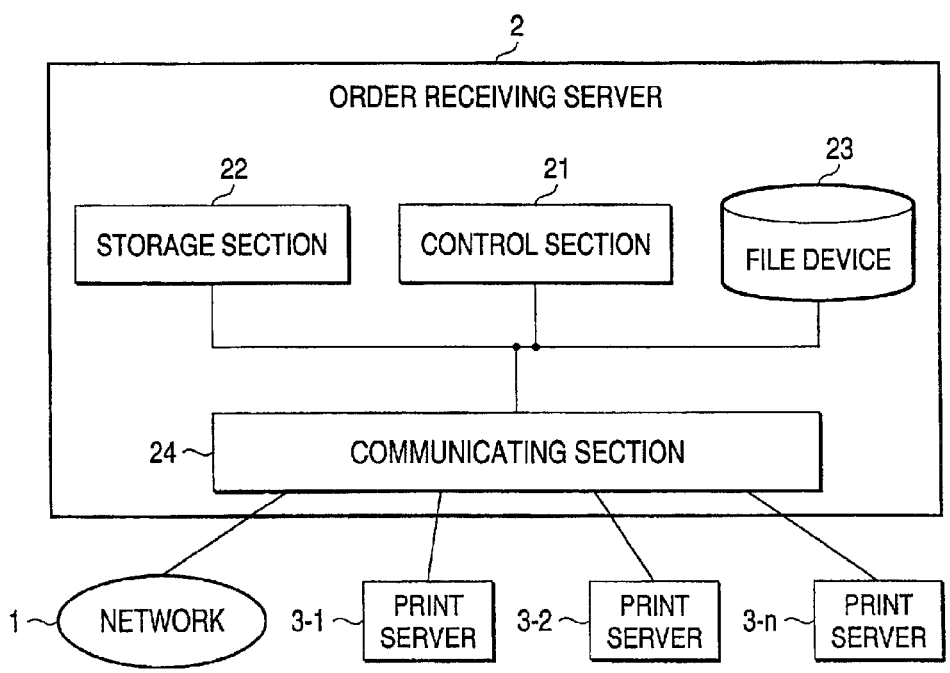
FIG. 2 is a diagram showing the schematic structure of a print order receiving server.

FIG. 2 shows the schematic structure of the print order receiving server. The print order receiving server 2 comprises a control section 21, a storage section 22, a file device 23 and a communicating section 24. The control section 21 serves to control the whole operation of the print order receiving server 2 and, more specifically, is mainly constituted by a processor for operating according to a program stored in the storage section 22. The storage section 22 serves to store the program and various data for controlling the operation of the print order receiving server 2 and is used as a temporary saving region for the digital image information and order request information which are transmitted from the mobile telephone and a work area of the processor. The file device 23 holds at least a printing destination information table and an ordering person table. The communicating section 24 serves to control transmission and receipt to and from the network 1 and the print servers 3-1, 3-2 and 3-n.

The printing destination information table held in the file device 23 records a print throughput of the printing destination and delivery region information corresponding to the printing destination or the print server. The print throughput includes a printing method capable of carrying out receipt, a print size and their processing speeds. The ordering person table records the ID of a mobile telephone owner previously registered as an order requester, the name of the owner and delivery destination information corresponding to each other. The ID can utilize a telephone number. Moreover, the print ordering person using the mobile telephone may record a personal identification number for confirming a true owner together. The ordering person table is created by registering a print order when the mobile telephone is purchased. While the file device 23 is provided in the order receiving server 2 in the FIG. 2, it maybe provided on the outside of the server 2 and may be connected directly or through the network.

Figure 3:
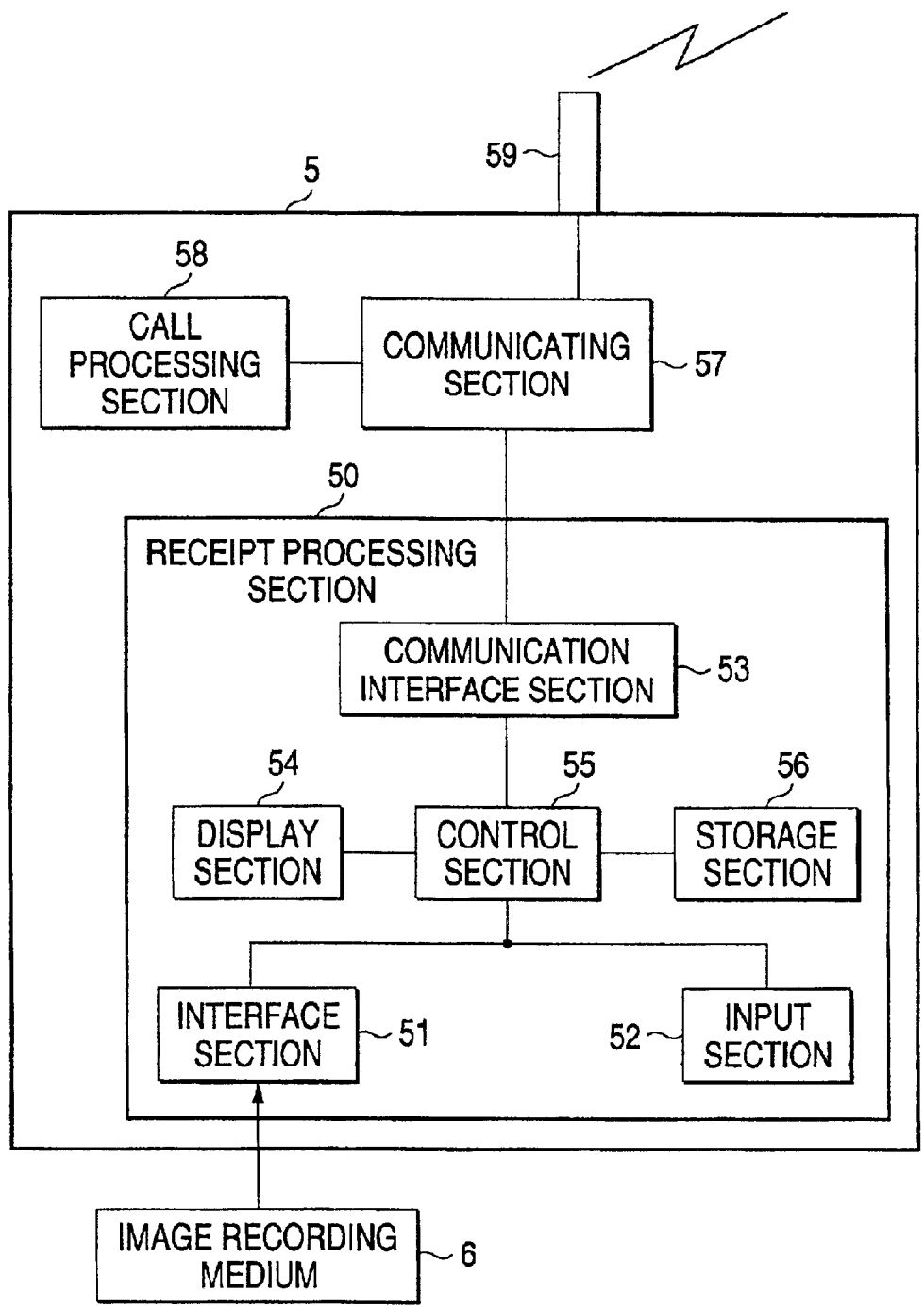
FIG. 3 is a diagram showing the schematic structure of an example of a mobile telephone which can give a print order.

FIG. 3 is a diagram showing the schematic structure of an example of a mobile telephone capable of giving a print order. The mobile telephone 5 comprises a call processing section 58 for carrying out an ordinary call processing, a communicating section 57, an antenna section 59, and furthermore, a receipt processing section 50 for carrying out a print order receipt processing. Since the call processing section 58 and the communicating section 57 are the same as those of the conventional art, detailed description will be omitted.

The receipt processing section 50 includes an interface section 51 for inputting digital image data from an image recording medium 6, an input section 52 for causing a user to input an operation, a communication interface section 53 for inputting and outputting data together with the communicating section 57, a display section 54, a storage section 56 and a control section 55. The control section 55 serves to control the whole print order receipt processing, and is mainly constituted by a processor for executing a processing according to a program stored in the storage section 56. The processor constituting the input section 52, the display section 54, the storage section 56 and the control section 55 can be shared with that of the call processing section 58. Moreover, the image recording medium 6 is varied according to the manufacturer or type of a digital camera. Therefore, the interface section 51 has such a structure as to be connected to plural kinds of image recording media.

When ordering prints utilizing the mobile telephone 5, a digital image to be printed are read into storage section 56, then create order request information including print condition for specifying a print condition for each digital image by utilizing input section 52, display section 54 and control section 55. If the mobile telephone 5 is capable of directly transmitting image information read from the image recording medium 6, image information is not necessarily recorded onto storage section 56. The storage section may comprise an internal fixed memory or removal memory device. As examples for the latter, smart media, micro memory card and micro drive can be mentioned, but not limited to those. Memory capacity is favorably 32 MB or more, or more favorably 64 MB or more.

Print condition included in the order request information includes at least one of a printing method, a print size and the number of prints for each digital image to be printed. As the printing method, it is possible to specify a printing medium such as a glossy paper or a plain paper in addition to glossy or mat color paper print, ink jet print and the creation of a transmission type film.

If a mobile telephone and a digital camera are integrated, an interface portion of a digital camera can be utilized as the interface section 11, and an internal memory of digital camera can be utilized as the storage section 56.

Next, a flow for carrying out a print order by utilizing the system and the mobile telephone of the invention according to the first embodiment of the invention will be described with reference to FIG. 4.

A user who gives a print order for a digital image by using a mobile telephone previously registers a delivery destination for a created print when making the contract of a mobile telephone. In the case in which a digital image photographed by means of a digital camera is to be printed, the image recording medium 6 recording digital image information is connected to the interface section 51 of the mobile telephone 5 (step 114), and the mobile telephone 5 is set to print order mode. Then, an image based on the digital image information is displayed on the display section 54 to select an image for which a print order is to be given (Step 101), and at least one of a printing method, a print size and the number of prints for each digital image to be printed is input as a print condition (Step 102). As the printing method, it is possible to specify a printing medium such as a glossy paper or a plain paper in addition to glossy or mat color paper print, ink jet print and the creation of a transmission type film. A print condition input is carried out by sequentially displaying at the display section 54 alternatives to each item to be inputted, followed by a selection from the alternatives using ten-keys in the input section 52, etc. For example, in a case a printing method is to be inputted, a screen shown in FIG.

5 is displayed at the display section 54. In the case in which the same print condition is to be selected for a plurality of selected images, the print condition may be input collectively after the selection of an image. Further, after inputting the print condition, a total of print fee may be displayed.

Next, a connection to the print order receiving server 2 is carried out based on a predetermined telephone number (Step 103). The order receiving server 2 confirms the telephone number of an ordering person which is automatically received by referring to the ordering person table of the file device 23 (Step 104), and a response is given when the order receipt can be carried out (Step 105). At this time, furthermore, a personal identification number may be required to be input. In the case in which the telephone number is not registered in the ordering person table, a response thereof is given and the process is ended. In the case in which the mobile telephone number is not utilized as an ordering person ID, an instruction for transmitting an ID is given after the connection and confirmation is carried out.

The user transmits image information and print condition information after receiving a receipt enable response is received (Step 106). At this time, request information other than the print condition, for example, delivery time specification information may be transmitted. The order receiving server 2 receiving the information about an image to be printed and the print condition information transmits a receipt completion response to the mobile telephone 5 (Step 107) and the communication is thus ended. It is also possible to use such a structure that order information can be transmitted to the mobile telephone 5 together with the receipt completion response and the user can confirm the contents of the order. In order to decrease a time required for the communication, the selection of an image and the input of the print condition are carried out in advance.

After the communication is completed, the order receiving server 2 refers to the printing destination information table of the file device 23 and selects a printing destination according to the print condition (Step 108). More specifically, since only a specific printing destination can process a print depending on the print condition, a printing destination capable of carrying out a printing process is selected. In the case in which the printing process can be carried out at a plurality of printing destinations, the printing destination which is the closest to the registered delivery destination of a created print is selected. At this time, the printing destination may be variously selected for each digital image depending on an order. Then, delivery information required for the delivery such as the name of a print ordering person and information about a registered delivery destination which are acquired from the ordering person table of the file device 23 are transmitted together with the received image information and print condition to the print server to be the selected printing destination (Step 109).

At the printing destination, the printing process is carried out based on the image information and the print condition which are transmitted to the print server (Step 110), and an order print thus created is delivered to the registered delivery destination which is transmitted (Step 111). A request for the delivery may be given to a distributor. When the delivery is completed, a delivery completion notice is transmitted to the order receiving server 2 by using the print server or another means (Step 112).

The order receiving server 2 receiving the delivery completion notice carries out an accounting process of a print charge. While a method of adding the charge to a telephone charge is convenient for the accounting, another bank account or a credit settlement may be selected in advance. In the case of other methods, a bank account number is previously recorded in the ordering person table.

In the embodiment, since a request for a print order can be easily given at a moving destination, a necessary print can be acquired immediately.

In a second embodiment of the invention, it is possible to specify a method of receiving a print when giving a request for a print order. While the structure of a system is basically the same, a program to be stored in storage sections 22 and 56 of a mobile telephone 5 and an order receiving server 2 and information to be previously held in a file device 23 are different. In the second embodiment, the file device 23 further holds a print service shop capable of carrying out delivery at the store, a service shop table to which region information thereof corresponds, and a delivery table in which a print service shop corresponds to a printing destination capable of carrying out delivery to the print service shop. The print service shop includes a convenience store and a general DP agency in addition to a service shop for carrying out a printing process. Further, the mobile telephone 5 receives print service shop candidates, retained in the service shop table, when making order request information, displays the print service shop candidates on the display section 54 to prompt a user for selection.

Figure 5:
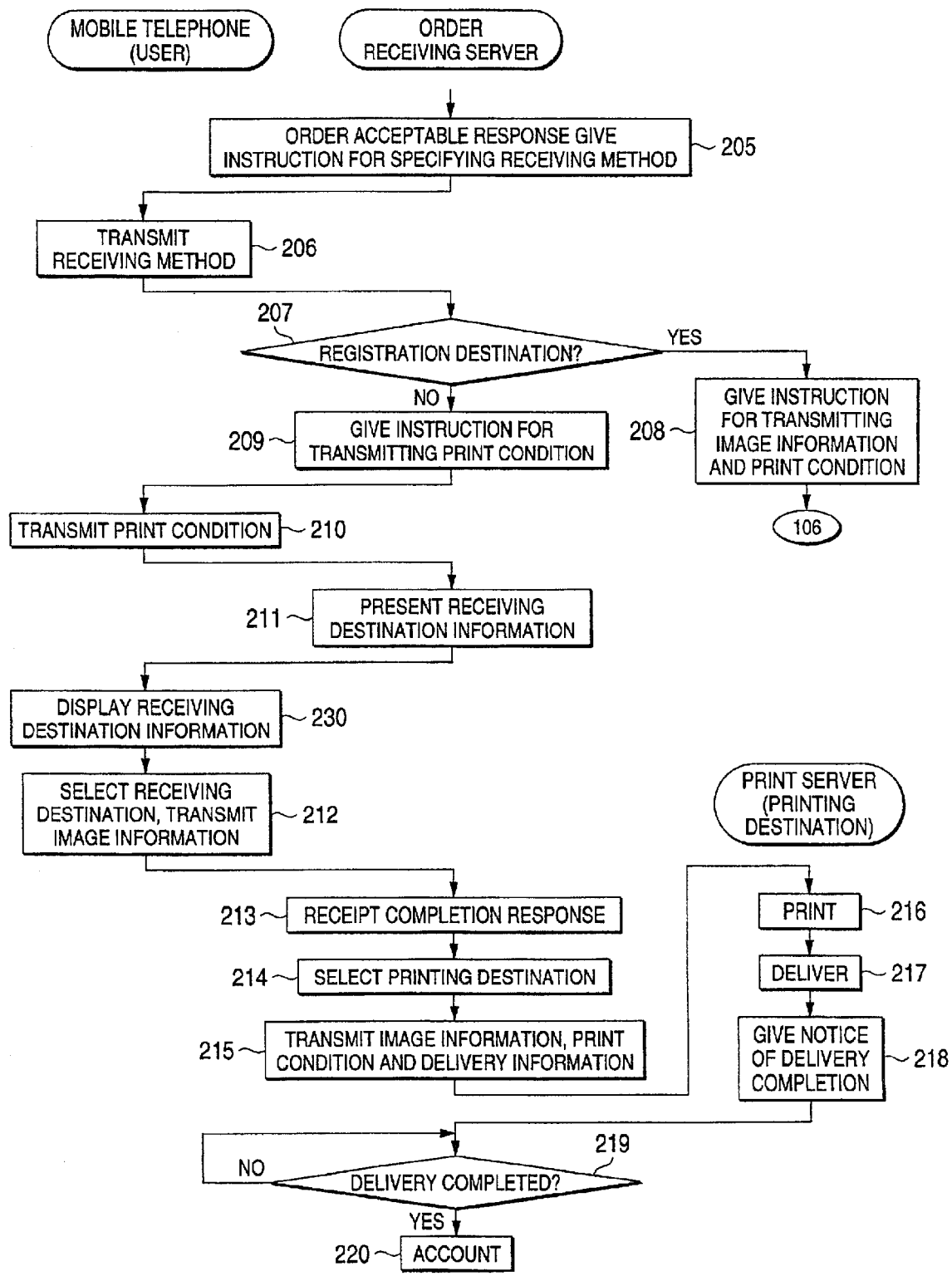
FIG. 5 is a flow chart showing a print order utilizing a system according to a second embodiment.

A flow for giving a print order by utilizing the system according to the second embodiment of the invention will be described with reference to FIG. 5.

Figure 4:
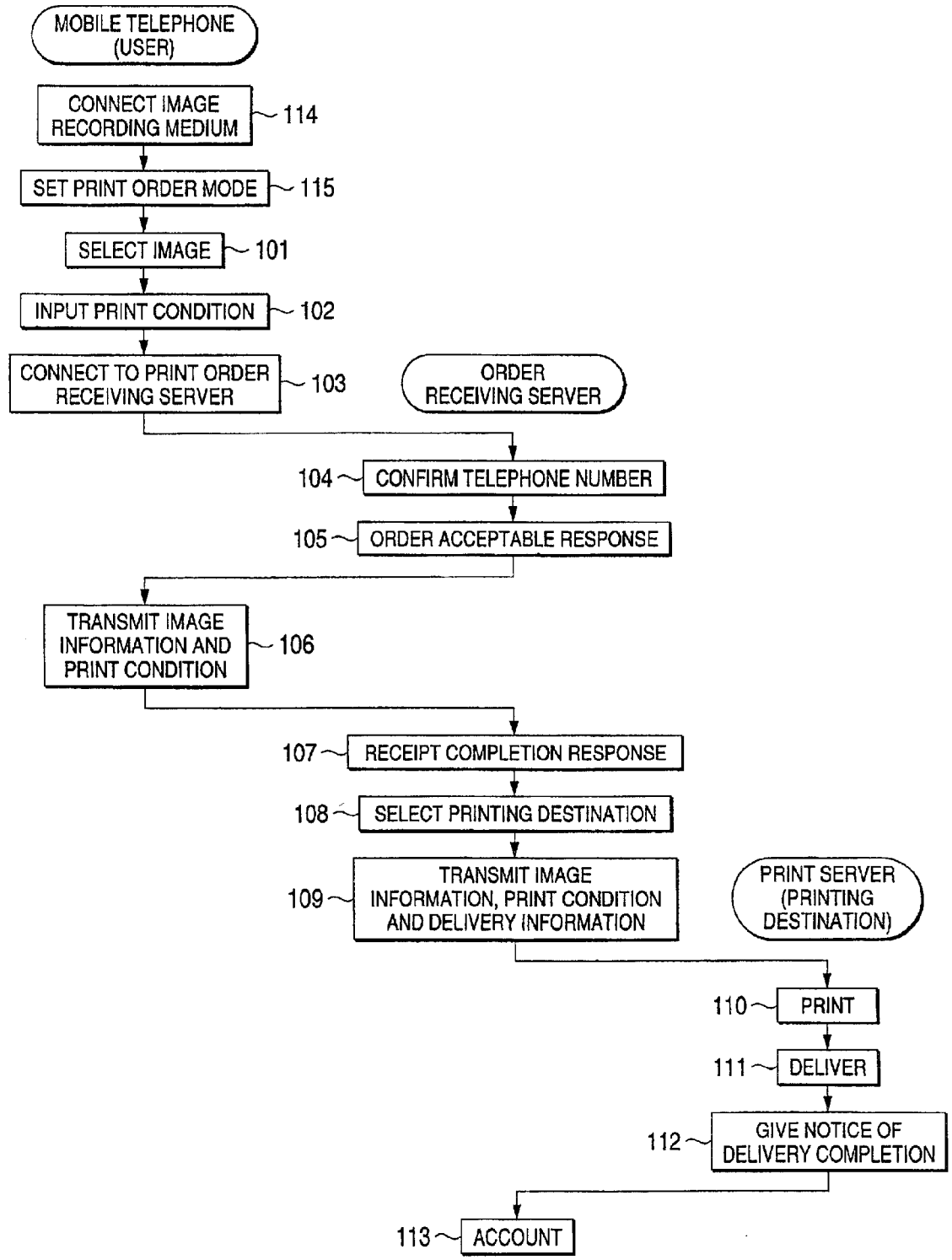
FIG. 4 is a flow chart showing a print order utilizing a system according to a first embodiment.

Since the procedure for selecting an image, inputting a print condition, carrying out a connection to the print order receiving server 2 and confirming a telephone number when giving a print order for a digital image by utilizing the mobile telephone 5 is the same as the flow of FIG. 4, description will be omitted.

In the case in which an order can be received from the mobile telephone 5 according to the confirmation of the telephone number, a receipt enable response is sent and an instruction for specifying a method of receiving a print is given (Step 205). In response to the instruction, a user specifies and transmits the receiving method (Step 206). As the receiving method, it is possible to select a method of receiving a print at a service shop or delivery to a previously registered delivery destination.

The order receiving server 2 decides the receiving method thus received (Step 207). If the delivery to a previously registered delivery destination is decided, an instruction for transmitting image information and a print condition is given to the mobile telephone 5 (Step 208). A subsequent flow is the same as the flow at and after the step 106 of FIG. 4.

If the result of decision obtained at the Step 207 is the receipt at a service shop, the order receiving server 2 gives an instruction for transmitting the print condition to the mobile telephone 5 (Step 209). After the print condition transmitted from the mobile telephone 5 (Step 210) is received, the order receiving server 2 presents, to the mobile telephone 5, as receiving destination information a service shop capable of carrying out delivery in a predetermined region including the position of the mobile telephone 5 giving an order (Step 211). In the case in which the information about the position of the mobile telephone 5 can be acquired through a mobile telephone service network, it is utilized. In the case in which the same information cannot be acquired, region selection information is transmitted to the mobile telephone 5 to cause the user to carry out selection. The mobile telephone 5 displays given service shop candidates at display section 54 (step 230) and wait for user's selection. If necessary, the service shop candidate may be displayed as an existing location of the shop on a map. In the case in which the print is to be received in a place other than the presented service shop, the user selects another region. A service shop corresponding to a region is selected with reference to the service shop table of the file device 23.

When the user selects a receiving destination and transmits the receiving destination together with image information (Step 212), the order receiving server 2 transmits a receipt completion response to the mobile telephone 5 (Step 213) and the communication is then ended. In the same manner as in the example of FIG. 4, order information may be transmitted to the mobile telephone 5 together with the receipt completion response.

After the communication is ended, the order receiving server 2 refers to the printing destination information table and the delivery table in the file device 23 and selects a printing destination corresponding to the print condition and the specified receiving destination information (Step 214). Also in this case, it is also possible to select a printing destination which is varied for each digital image depending on an order in the same manner as in FIG. 4. Then, information required for the receipt such as information about a receiving destination (delivery destination service shop) and the name of a print ordering person acquired from the ordering person table of the file device 23 are transmitted as delivery information together with the received image information and print condition to the print server being selected as a printing destination (Step 215).

At the printing destination, a printing process is carried out based on the image information and the print condition which are transmitted to the printer server (Step 216), and a created order print is delivered to a delivery destination service shop which is transmitted (Step 217). In the case in which the printing destination is coincident with the receiving destination, it is a matter of course that the delivery is not required. A request for the delivery may be given to a distributor. When the delivery is completed, the printing destination or the delivery destination service shop transmits a delivery completion notice to the order receiving server 2 by using the print server or another means (Step 218). The service shop waits for the user to come over, and transmits a delivery completion notice to the order receiving server 2 by using the print server or another means when the print delivery is completed.

After the image information and the print request information are transmitted to the printing destination, the order receiving server 2 waits for the delivery completion notice from the receiving destination service shop (Step 219) and carries out an accounting process if the completion notice is given (Step 220). The accounting process is carried out in the same manner as in FIG. 4.

In the embodiment, since the receipt can be carried out at a service shop close to a moving destination, a necessary print can be acquired more immediately.

In a third embodiment of the invention, a method of paying a print charge can be specified when giving a print order. Although the basic structure of a system is the same as that of each of the first and second embodiments, a method of payment is transmitted together when request information such as image information and a print condition are to be transmitted. As the method of payment, it is possible to select a previously specified method such as telephone charge addition payment, a method of carrying out payment simultaneously with receipt at a receiving destination, and a method of carrying out payment during delivery to a specified destination.

In a fourth embodiment of the invention, a request for saving the transmitted image information is sent when a print order is given. As a saving destination, it is also possible to select a file device 23 of an order receiving server 2 or another file device (not shown), or a file device which is accessible through a network, for example, a file device in another server connected to a network 1 or to select a portable recording medium such as a CD-ROM or a DVD. When the portable recording medium is selected, the receiving method can also be specified.

In the embodiment, it is possible to recycle a recorded medium of a recording medium during photographing through a digital camera at a moving destination.

In a fifth embodiment of the invention, an order receiving server 2 gives a mobile telephone 5 a notice that printing is completed or receipt can be carried out. In the case in which the notice of the print completion is to be given, the notice of the print completion is received from a printing destination after the Step 110 in FIG. 4 and the Step 216 in FIG. 5 and is then given to the mobile telephone 5. In the case in which the notice that the receipt can be carried out is to be given, the notice at the Step 218 in FIG. 5 is received and is then given to the mobile telephone 5.

In the embodiment, an ordering person can automatically know the situation of progress of the print at a moving destination, and particularly, the print can be effectively received in a print service shop.

In a sixth embodiment of the invention, it is possible to recognize the situation of progress of the creation of an ordered print by making inquiries from the mobile telephone to an order receiving server. As described in the fifth embodiment, since the order receiving server 2 can acquire the situation of progress of the received print order, it holds the situation of progress thus acquired and answers the inquiry given from the mobile telephone 5.

In the embodiment, an ordering person at a moving destination can make an inquiry about the situation of progress of the print at any time, which is useful for an action plan at the moving destination.

Figure 6:
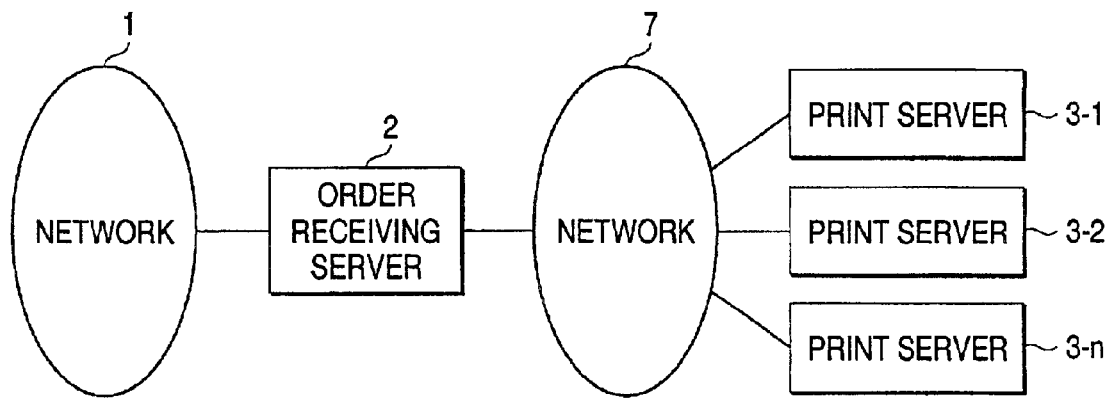
FIG. 6 is a diagram showing another example of a connection of an order receiving server and a print server.
Figure 7:
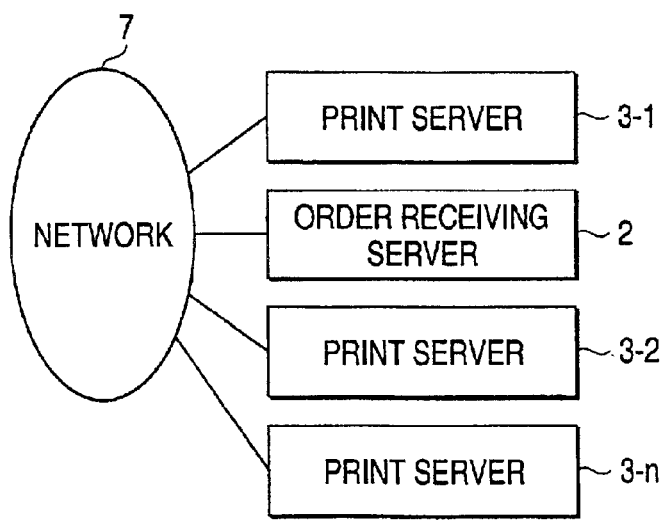
FIG. 7 is a diagram showing a further example of the connection of the order receiving server and the print server.

While the order receiving server 2 is directly connected to the print servers 3-1, 3-2 and 3-n in FIG. 1, they may be connected to a network 7 in place of the network 1 as shown in FIG. 6. Moreover, they may be connected through the network 1 as shown in FIG. 7.

Moreover, while the delivery information is created by utilizing the ordering person table previously provided in the order receiving server in the first to fifth embodiments, it is also possible to employ such a structure that the name of an ordering person and delivery destination information are transmitted to the order receiving server at each time and the transmitted information is used. In that case, it is suitable that the name and the delivery destination information which are prestored in the storage section 56 of the mobile telephone are selectively transmitted.

Figure 9:
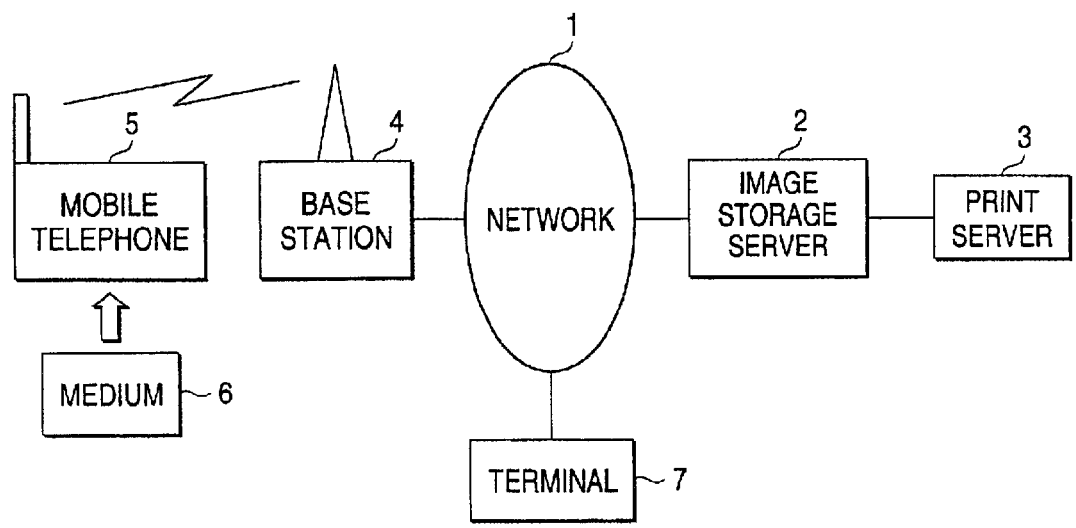
FIG. 9 is a diagram showing the schematic structure of an image storage service system according to the invention.

FIG. 9 is a diagram showing a seventh embodiment, the schematic structure of an image storage system according to the invention. An image storage server 302 is connected to a network 301 including a mobile telephone service network for mutually connecting base stations, and a print server 303 can be connected to the image storage server 302. The print server 303 is provided in a service shop or a laboratory which carries out a print processing based on digital image information and serves to cause one or more printers to carry out a predetermined printing processing. In the drawing, only one print server is shown and a connection to a plurality of print servers can be carried out.

A user requiring to transfer digital image information photographed by a digital camera attaches, to a mobile telephone 305, a recording medium 306 recording a photographed image which can be attached to and removed from the digital camera, and transmits the digital image information to be stored to the image storage server 302 through a base station 304 and the network 301. In that case, if the photographed digital image is to be printed at the same time, order request information is also transmitted together. The order request information includes print condition information for specifying at least one of a printing method, a print size and the number of prints for each digital image to be printed. A mobile telephone number is utilized for the identification information of the user.

When receiving the digital image information, the image storage server 302 stores the received image information and transmits, to the mobile telephone 305, storage processing information including a decision whether or not the storage has normally been carried out. In the case in which the print order request is transmitted at the same time, delivery information required for delivery such as digital image information to be printed, a print condition, the name of a print service user and information about a registered delivery destination are transmitted to the print server to be a printing destination.

When receiving the storage processing information, the mobile telephone 305 carries out a processing of erasing the transmitted digital image information recorded in the recording medium 306. While a digital image is erased when the storage processing is normally carried out, the digital image may be automatically erased upon receipt thereof or the contents of the storage processing information may be once displayed to wait for the instruction of the user and to then erase the digital image. For accounting with the storage service, a constant amount of money may be prepaid when making a contract with a specific server or a charge may be added to a telephone charge according to the amount of use of the service and may be thus collected.

At the printing destination, an order print created based on the information transmitted to the print server is delivered to the registered delivery destination which is transmitted. A request for the delivery may be given to a distributor. After the delivery is completed, a printing charge is added to a telephone charge and is thus collected.

A terminal device 307 is a computer of the user which can be connected to the network and serves to download the digital image information stored in the image storage server 302 or to give a print order for the stored digital image. In the drawing, only one terminal device 307 is illustrated.

Figure 10:
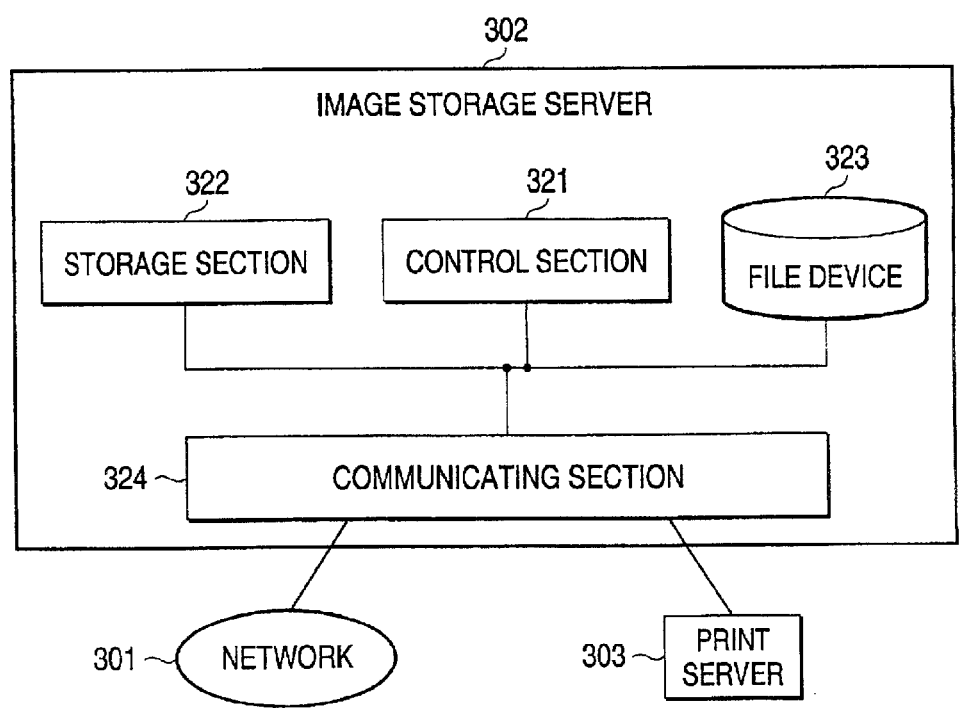
FIG. 10 is a diagram showing the schematic structure of an image storage server.

FIG. 10 shows the schematic structure of the image storage server. The image storage server 302 comprises a control section 321, a storage section 322, a file device 323 and a communicating section 324. The control section 321 serves to control the whole operation of the print image storage server 302 and, more specifically, is mainly constituted by a processor for operating according to a program stored in the storage section 322. The storage section 322 serves to store the program and various data for controlling the operation of the image storage server 302 and is used as a temporary saving area for the digital image information and order request information which are transmitted from the mobile telephone and a work area of the processor. The file device 323 includes at least a storage section for the digital image information transmitted from the mobile telephone, various data to be utilized for a print order and a service user table. The communicating section 324 serves to control transmission and receipt to and from the network 301 and the print server 303.

The storage section included and held in the file device 323 is an area in which the image information transmitted from the mobile telephone is to be stored for each user every transmission date and time. Data utilized for the print order include the print throughput of a printing destination and delivery region information corresponding to the printing destination or the print server. The print throughput includes a printing method, a print size and their processing speeds which can be received.

The service user table records the ID of a mobile telephone owner previously registered as a storage service user, the name of the owner and delivery destination information for giving a print order corresponding to each other. The ID can utilize a telephone number. Moreover, the service user utilizing the mobile telephone may record a personal identification number for confirming a true owner together. The service user table is created by registering image storage utilization when the mobile telephone is purchased. While the file device 323 is provided in the image storage server 302 in the drawing, it may be provided on the outside of the server 302 and may be connected directly or through the network.

As can be seen from FIG. 2 and FIG. 10, order receiving server 2 and image storage server 302 share several functions and/or components. Thus the order receiving server 2 and the image storage server 302 may be installed on a same hardware to share common portions between the two. If the installed hardware is a computer host, then the differences between the two may be realized by switching between computer programs. This can be implemented with a well known programming technique, thus the explanation with regard to function switching is omitted. Although the order receiving server 2 and the image storage server 302 are described to be being possible to implement in a same hardware, but the invention is not limited to this, and the two can of course be implemented divided in more than two separate hardware.

Figure 11:
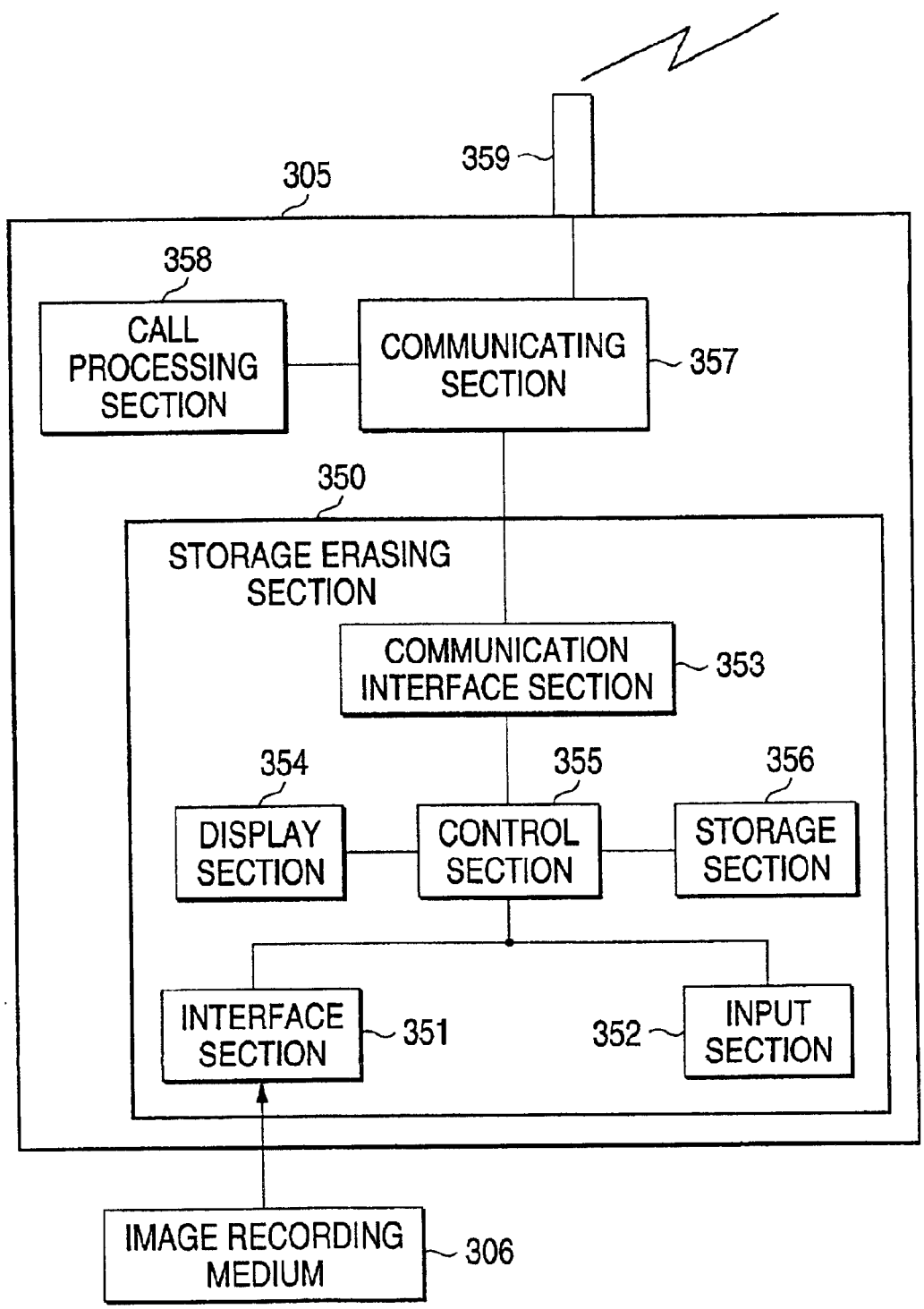
FIG. 11 is a diagram showing the schematic structure of an example of a mobile telephone which can give a request for image storage.

FIG. 11 is a diagram showing the schematic structure of an example of a mobile telephone capable of giving a request for image storage. The mobile telephone 305 comprises a call processing section 358 for carrying out an ordinary call processing, a communicating section 357, an antenna section 359, and furthermore, an image storage erasing section 350 for carrying out an image storage request processing, an image erase processing and a print order receipt processing. Since the call processing section 358 and the communicating section 357 are the same as those of the conventional art, detailed description will be omitted.

The image storage erasing section 350 includes an interface section 351 for inputting digital image data from an image removal recording medium 306, an input section 352 for causing a user to input an operation, a communication interface section 353 for inputting and outputting data together with the communicating section 357, a display section 354, a storage section 356 and a control section 355. The control section 355 serves to control the whole print order receipt processing, and is mainly constituted by a processor for executing a processing according to a program stored in the storage section 356. The processor constituting the input section 352, the display section 354, the storage section 356 and the control section 355 can be shared with that of the call processing section 358. Moreover, the image recording medium 306 is varied according to the manufacturer or type of a digital camera. Therefore, the interface section 351 has such a structure as to be connected to plural kinds of image recording media.

Although the mobile telephone 305 has the image storage erasing section 350 which functions differently from the receipt processing section 50 of the mobile phone 5, both the image storage section 350 and the receipt processing section 50 may be installed in a mobile telephone to share the common portions between the mobile telephone 305 and the mobile telephone 5. Switching between the image storage erasing section and the receipt processing section can be realized by widely known conventional techniques, thus the following explanation is based on the mobile telephone 305. But the invention is not limited to.

Figure 12:
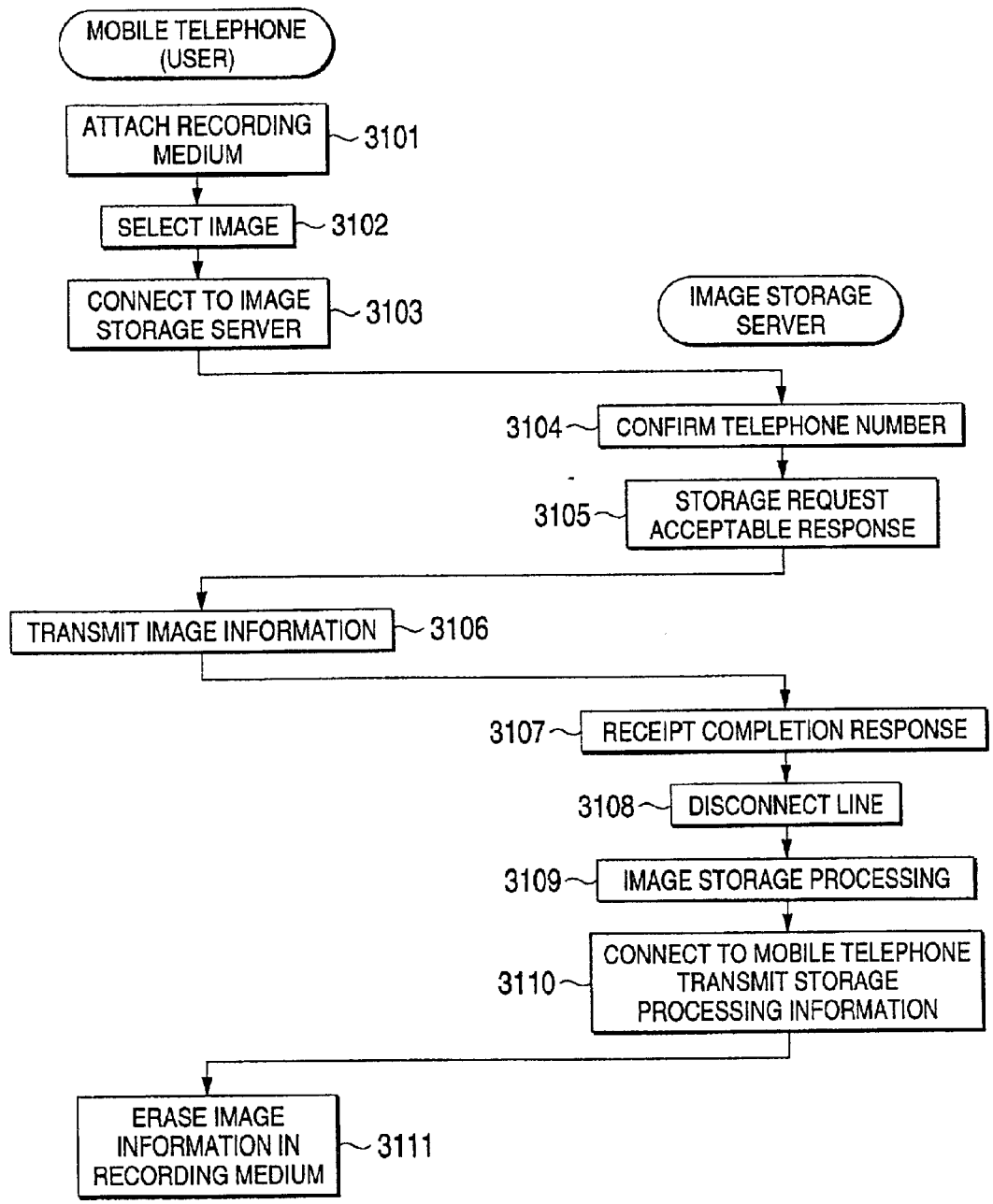
FIG. 12 is a flow chart for giving the request for image storage.

Next, a flow for carrying out an image storing request by utilizing the system according to the seventh embodiment of the invention will be described with reference to FIG. 12.

A user who gives a request for storing a digital image by using a mobile telephone is previously registered as a digital image storage service user when making the contract of the mobile telephone. In the case in which a digital image photographed by means of a digital camera is to be stored, the image recording medium 306 recording digital image information is taken out of a digital camera and is connected to the interface section 351 of the mobile telephone 305 (Step 3101). Then, an image based on the digital image information is displayed on the display section 354 to select an image for which a request for storage is to be given (Step 3102).

Next, a connection to the image storage server 302 is carried out based on a predetermined telephone number (Step 3103). The image storage server 302 confirms the telephone number of a service user which is automatically received by referring to the service user table of the file device 323 (Step 3104), and a response is given when the order receipt can be carried out (Step 3105). At this time, furthermore, a personal identification number may be required to be input. In the case in which the telephone number is not registered in the service user table, a response thereof is given and the process is ended. In the case in which the mobile telephone number is not utilized as an service user ID, an instruction for transmitting an ID is given after the connection and confirmation is carried out.

After receiving a receipt enable response, the user transmits image information and print condition information (Step 3106). The image storage server 302 receiving the image information to be stored transmits a receipt completion response to the mobile telephone 305 (Step 3107), ends the communication and once disconnects a line (Step 3108). In order to cause the mobile telephone 305 to carry out another processing such as a call and to prevent the amount of line usage from being increased in a connection state, the line is once disconnected. In order to decrease a time required for the communication, moreover, an image to be stored is previously selected before the connection. In the case in which all the images recorded in the recording medium 306 are to be transmitted, this processing is not required.

After the line is disconnected, the image storage server 302 stores the received image information in the storage area of the file device 323 (Step 3109). Then, a line is connected to a mobile telephone receiving a request for storage and storage processing information is transmitted thereto (Step 3110). The storage processing information includes at least a decision whether or not the storage processing has normally been carried out, and includes stored image ID information if the storage processing is not normally carried out.

The mobile telephone receiving the storage processing information carries out a postprocessing including the erase of the transmitted digital image information recorded in the recording medium 306. The post processing method can be variously selected. When the storage processing information indicates that it is normally stored, the transmitted image information is automatically erased, for example. In this case, it is premised that the recording medium used during image transmission is attached to the mobile telephone 305. Since a method of confirming the identity of the recording medium is well known, description will be omitted. In the case in which the same recording medium is not attached, it is possible to display, on the display section 354, a notice that the same recording medium is to be attached.

In the case in which only a part of the images is stored, a notice of this partial storage is displayed on the display section 354. In this case, it is also possible to subsequently carry out a processing of transmitting the image failing in storage to the image storage server, and the user is caused to select that the normally stored image information is automatically erased and the processing is ended or not.

In the case in which there is an anxiety about the automatic erase of the recorded digital image, the erase processing may be executed after waiting for the confirmation of the execution of the erase processing.

Figure 13:
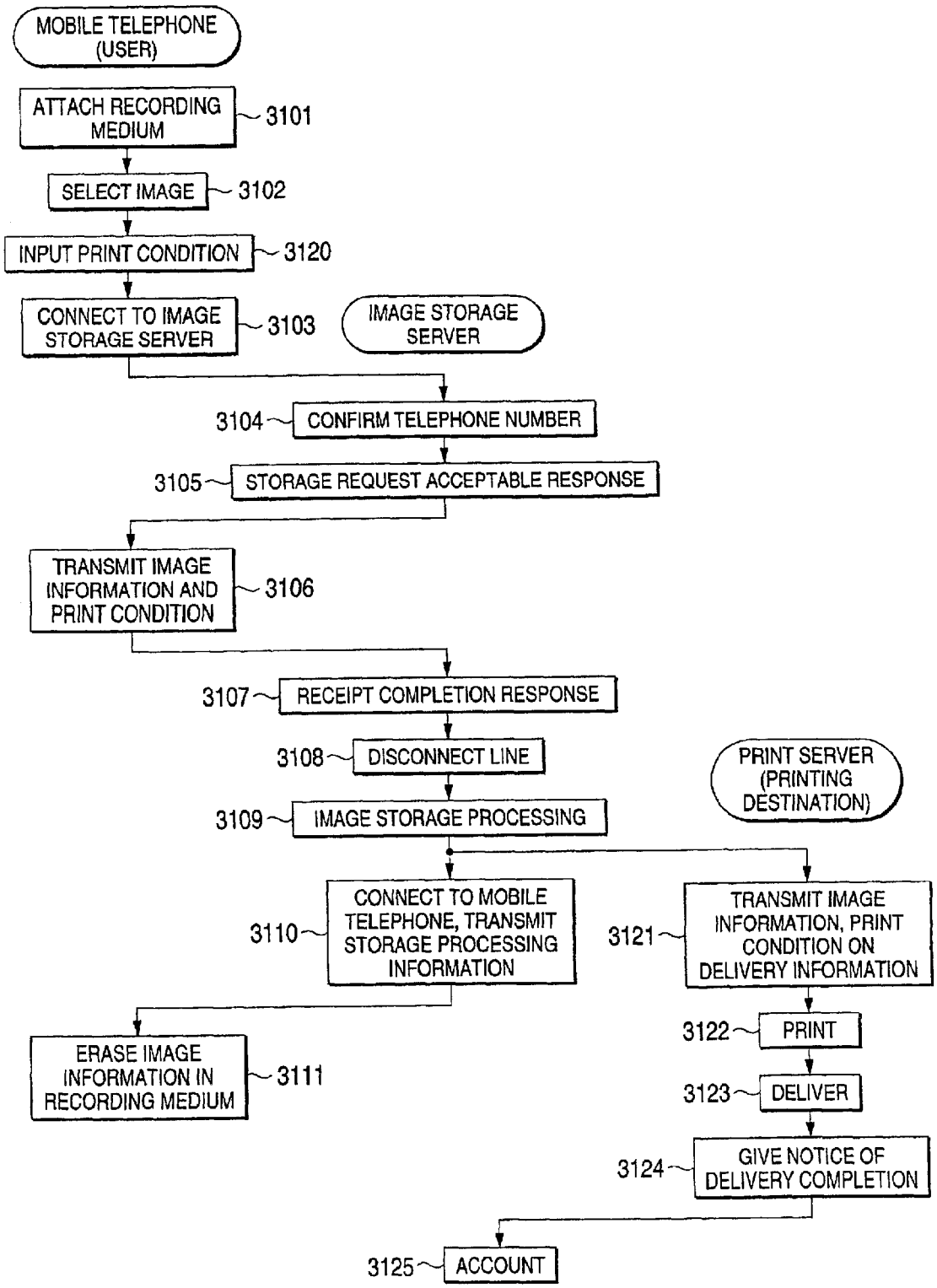
FIG. 13 is a flow chart for giving a request for a print order together with the request for image storage.

When a request for image storage is to be given, the system shown in FIG. 9 can give a request for a print order at the same time. The flow to be carried out in that case will be described with reference to FIG. 13. Since the flow of FIG. 13 is basically the same as that of FIG. 12, different portions from the portions in FIG. 12 will be mainly described.

When images based on digital image information are displayed on the display section 354 to select an image for which a request for storage is to be given at Step 3102, an image for which a request for a print order is to be given is extracted. Then, a print condition is input at Step 3120. At least one of a printing method, a print size and the number of prints for each digital image to be printed is input as a print condition. As the printing method, it is possible to specify a printing medium such as a glossy paper or a plain paper in addition to glossy or mat color paper print, ink jet print and the creation of a transmission type film. In the case in which the same print condition is to be selected for a plurality of selected images, the print condition may be input collectively after the selection of an image.

Subsequently, a receipt enable response is received from the image storage server (Step 3105) and print condition information is then transmitted together with image information (Step 3106). At this time, request information other than the print condition, for example, delivery time specifying information may be transmitted.

The image storage server 302 executes an image storage processing at Step 3109, and then at step 3110 connects a line to a mobile telephone having sent the storage request and transmits storage processing information, and at the same time, transmits at step 3121, to a predetermined print server, delivery information required for delivery such as the name of a print service user acquired from the service user table of the file device 323 and information about a registered delivery destination together with the image information and the print condition which are received.

At the printing destination, the printing process is carried out based on the image information and the print condition which are transmitted to the print server (Step 3122), and an order print thus created is delivered to the registered delivery destination which is transmitted (Step 3123). A request for the delivery may be given to a distributor. When the delivery is completed, a delivery completion notice is transmitted to the image storage server 302 by using the print server or another means (Step 3124).

The image storage server 302 receiving the delivery completion notice carries out an accounting process of a print charge. While a method of adding the charge to a telephone charge is convenient for the accounting, another bank account or a credit settlement may be selected in advance. In the case of other methods, a bank account number is previously recorded in the service user table.

In the embodiment, since a request for a print order can be easily given at a moving destination, a necessary print can be acquired immediately.

Figure 14:
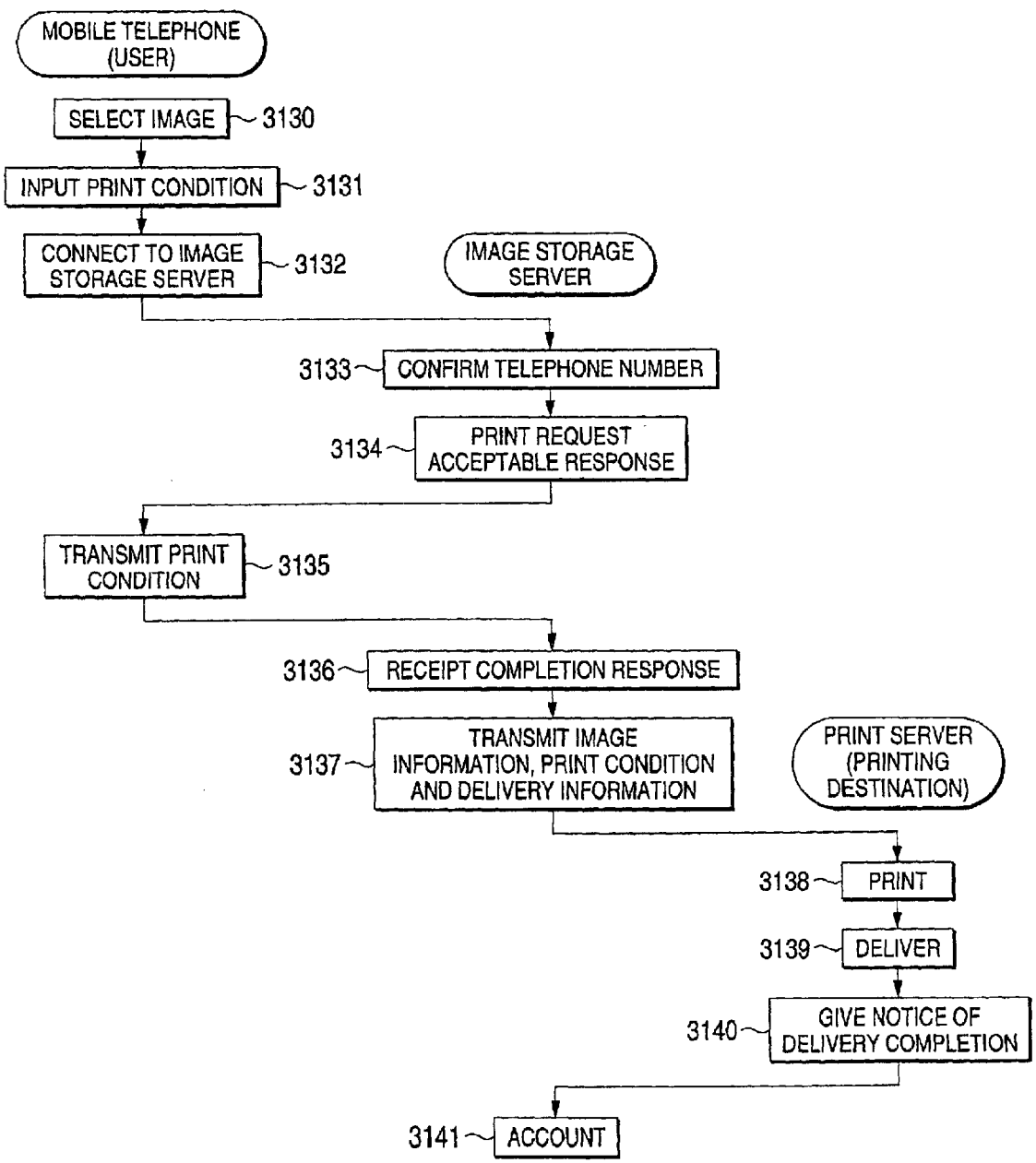
FIG. 14 is a flow chart for giving the request for a print order.

The system shown in FIG. 9 can also give a request for a print order again after the storage of the image. The order request can be given from the terminal device 307 at home in addition to a mobile telephone. FIG. 14 shows a flow to be carried out when the order request is to be given from the mobile telephone.

The flow of FIG. 14 shows the case in which a print request is given in such a state that the stored image information is unerased. A user giving a print order for a digital image displays, on the display section 354, images based on the stored image information which is recorded in the image recording medium 306 to select an image for which a print order is to be given (Step 3130), and inputs at least one of a printing method, a print size and the number of prints for each digital image to be printed as a print condition (Step 3131). Subsequently, a connection to the image storage server 302 is carried out based on a predetermined telephone number (Step 3132) and the image storage server 302 confirms the telephone number of a service user which is automatically received by referring to the service user table of the file device 323 (Step 3133), and a response is given when the storage request can be received (Step 3134).

The user transmits print condition information after receiving the response of storage request acceptable (Step 3135). At this time, request information other than the print condition, for example, delivery time specifying information may be transmitted. The image storage server 302 receiving the print condition information to be printed transmits a receipt completion response to the mobile telephone 305 (Step 3136) and the communication is thus ended. It is also possible to use such a structure that order information can be transmitted to the mobile telephone 305 together with the receipt completion response and the user can confirm the contents of the order.

In the case in which the image of the recording medium 306 has been erased or a request for a print order is given through the terminal device 307 at home, it is impossible to select an image and to input a print condition before a connection to the image storage server 302. Therefore, the Step 3132 is started and the connection to the image storage server 302 is carried out and the selection of an image and the input of a print condition are then executed upon receipt of the transmission of necessary image information. In this case, transfer image information does not need to have high precision.

The image storage server 302 transmits, to a predetermined print server, delivery information required for the delivery such as the name of a print service user and information about a registered delivery destination which are acquired from the service user table of the file device 323 together with the image information and the print condition which are received (Step 3137).

At the printing destination, the printing process is carried out based on the image information and the print condition which are transmitted to the print server (Step 3138), and an order print thus created is delivered to the registered delivery destination which is transmitted (Step 3139). A request for the delivery may be given to a distributor. When the delivery is completed, a delivery completion notice is transmitted to the image storage server 302 by using the print server or another means (Step 3140).

The image storage server 302 receiving the delivery completion notice carries out an accounting process of a print charge. While a method of adding the charge to a telephone charge is convenient for the accounting, another bank account or a credit settlement may be selected in advance. In the case of other methods, a bank account number is previously recorded in the service user table.

The image information stored in the image storage server 302 is not only used for a request for a print order but can be downloaded into the terminal device 307 at home and can be utilized for various processings such as an edit processing. Moreover, it is also possible to transfer the image information to friends by electronic mail.

In the case in which the stored image information is to be downloaded, an access is given to the image storage server to select predetermined image information in the same manner as described above. Since the downloading operation itself is well known, description will be omitted.

[Effect of the Invention]

As is apparent from the above description, according to the invention, a print order for a digital image photographed at a moving destination can easily be given at the moving destination and a necessary print can be acquired immediately.

What is claimed is:

1. A print service system for creating a print based on digital image information, comprising:

an order receiving server connected to a network; and a mobile telephone which can be connected to the network, wherein the mobile telephone serves to transmit digital image information to be printed and order request information including print condition information for specifying a print condition to the order receiving server through the network, and the order receiving server serves to transmit the received digital image information and print condition information to a printing destination corresponding to the received print condition information.

2. A print service system for creating a print based on digital image information, comprising:

an order receiving server connected to a network; and a mobile telephone which can be connected to the network, wherein the mobile telephone serves to transmit digital image information to be printed and order request information including print condition information for specifying a print condition and receipt information for specifying a method of receiving a created print to the order receiving server through the network, and the order receiving server serves to transmit the received digital image information and print condition information to a printing destination corresponding to the print condition information and the receipt information which are received.

3. A print order receiving server for receiving a print order based on digital image information sent from a mobile telephone through a network, wherein digital image information to be printed and order request information including print condition information for specifying a print condition are received, and the digital image information and the print condition information which are received are transmitted to a printing destination corresponding to the received print condition information.

4. A print order receiving server for receiving a print order based on digital image information sent from a mobile telephone through a network, wherein digital image information to be printed and order request information including print condition information for specifying a print condition and a method of receiving a created print are received, and the digital image information and the print condition information which are received are transmitted to a printing destination corresponding to the print condition information and the receipt information which are received.

5. A mobile telephone for giving a print order based on digital image information, comprising:

a memory for storing digital image information to be printed; and order request information creating means for creating order request information including print condition information for specifying a print condition of the digital image information, wherein an access can be given to an order receiving server for receiving a print order through a network and the digital image information to be printed which are stored in the memory and the order request information created by the order request information creating means are transmitted to the order receiving server.

6. A mobile telephone for giving a print order based on digital image information, comprising:

a memory for storing digital image information to be printed; and order request information creating means for creating order request information including print condition information for specifying a print condition of the image information and receipt information for specifying a method of receiving a created print, wherein an access can be given to an order receiving server for receiving a print order through a network and the digital image information to be printed which are stored in the memory and the order request information created by the order request information creating means are transmitted to the order receiving server.

7. An image storage service system for storing digital image information, comprising:

an image storage server connected to a network; and a mobile telephone to which a removable recording medium recording digital image information can be attached and which can be connected to the network, wherein the mobile telephone serves to transmit the digital image information recorded in the recording medium to the image storage server through the network, and the image storage server serves to store the digital image information thus received and to transmit storage processing information to the mobile telephone carrying out the transmission after a storage processing.

8. An image storage server for storing digital image information which receives digital image information to be stored which is transmitted from a mobile telephone through a network, and stores the digital image information thus received and transmits storage processing information to the mobile telephone carrying out the transmission after a storage processing.

9. A mobile telephone accessible to an image storage server for storing digital image information through a network, wherein a removable recording medium recording digital image information can be attached to the mobile telephone, the mobile telephone further having means for erasing the transmitted digital image information from the recording medium depending on storage processing information received from the image storage server after transmitting the digital image information recorded in the recording medium to the image storage server.

* * * * *